United States Patent [19]

Ghosh

[11] 4,417,192

[45] Nov. 22, 1983

[54] SECTIONAL MOTOR STARTING WINDING CIRCUIT FOR THREE-PHASE MOTORS

[75] Inventor: Shyamal-Krishna Ghosh, Bad Neustadt, Fed. Rep. of Germany

[73] Assignee: Siemens Aktiengesellschaft, Munich, Fed. Rep. of Germany

[21] Appl. No.: 343,276

[22] Filed: Jan. 27, 1982

[30] Foreign Application Priority Data

Feb. 27, 1981 [DE] Fed. Rep. of Germany ....... 3107654

[51] Int. Cl.³ ............................................. H02P 1/42
[52] U.S. Cl. .................................................. 318/797
[58] Field of Search ............... 318/797, 816, 817, 781; 310/184

[56] References Cited

U.S. PATENT DOCUMENTS 2,649,561  8/1953  Hutchins ............................. 318/797
3,068,389  12/1962  Cantonwine ......................... 318/797
3,237,072  2/1966  Contonwine ......................... 318/797

Primary Examiner—David Smith, Jr.
Attorney, Agent, or Firm—Kenyon & Kenyon

[57] ABSTRACT

A circuit for starting three-phase motors having a pole pair number $p=2$ and an uneven slot number $q$ (slots per pole and phase) which is larger than 1 has a motor winding which is divided into two sections which can be switched on successively. To avoid a unilateral magnetic pull on the rotor during start up, the winding section to be switched on first includes more than one-half of the coils employed in each phase. These coils are tied together to form at least two identical parallel branches which are spatially shifted 360° per pole. The balance of the coils, which form the winding section to be switched on later, are tied together to form at least one further parallel branch, and this branch (or branches) has the same number of turns as each of the parallel branches of the winding section which is to be switched on first.

2 Claims, 4 Drawing Figures

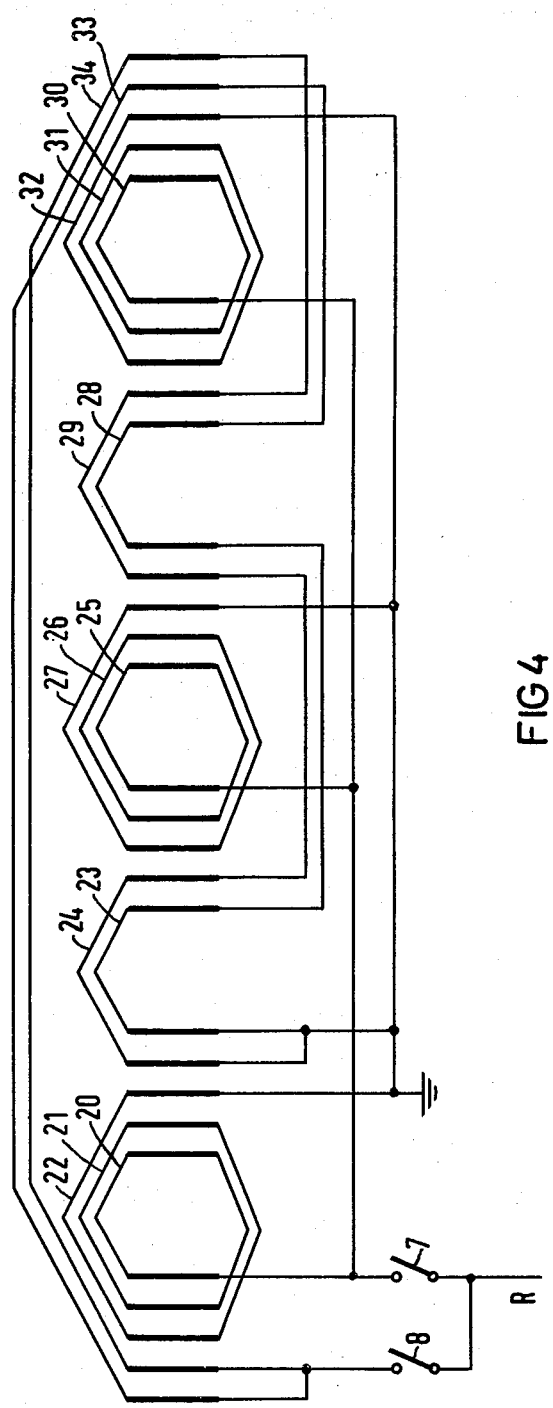

SECTIONAL MOTOR STARTING WINDING CIRCUIT FOR THREE-PHASE MOTORS

BACKGROUND OF THE INVENTION

This invention relates to a sectional motor winding circuit for use in starting three-phase motors. More particularly, the invention relates to such a winding circuit in which the motor has a pole pair number $p=2$ and an uneven slot number $q$ (slots per pole and phase) which is larger than 1 and in which the motor winding, realized as a one-layer winding, is subdivided into two winding sections which are adapted to be switched on sequentially.

In one known sectional winding circuit for motor starting, the motor winding is subdivided into two equal winding sections and the winding coils associated with spatially immediately adjacent poles are tied together to form a winding section. Such a subdivision leads, especially in the case of an uneven slot number, to large operating asymmetries in the motor so that the rotor is stressed unilaterally by magnetic pull.

It is an object of the invention to provide a sectional winding circuit in which the rotor of the motor is not subjected to a unilateral magnetic pull when there is an uneven slot number q (q=slots per pole and phase) and in which thermal overloading during starting is prevented by reduction of the starting current.

SUMMARY OF THE INVENTION

According to the present invention, the above problem is solved by providing that the winding section which is to be switched on first for each phase shall include more than one-half of the coils and that these coils are tied together to form at least two equal parallel branches (groups), with the coils in one of the branches being spatially shifted 360°/p. The remaining coils form the winding section which is to be switched on later and are tied together to form at least one further parallel branch. Each such further branch has the same number of turns as each parallel branch in the winding section which is to be switched on first. Since the current-carrying coils are shifted 360°/p (360° per pole pair), the magnetic pulling forces cancel each other. Switching on more than half the coils leads also to a correspondingly strong reduction of the starting current. The magnitude of the starting current therefore remains below the value which is given by the anti-stall protection circuit of the motor.

In a 4-pole motor having a slot number $q=3$, full symmetry during starting and operation is achieved in a simple manner by providing that the winding section which is to be switched on first consists of two parallel branches, each having two coils connected in series. The remaining two coils which form the winding section which is to be switched on later are likewise connected in series and are adapted to be connected as a third branch in parallel to the two branches of the winding section which can be switched on first.

BRIEF DESCRIPTION OF THE DRAWINGS

FIG. 4 is a winding diagram of a sectional winding for a 6-pole motor in which the slot number is $q=5$.

DETAILED DESCRIPTION OF THE INVENTION

Figure 1:
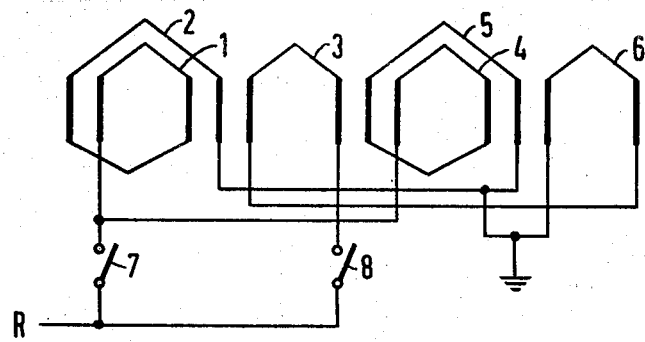
FIG. 1 is a winding diagram of a sectional winding according to the invention for a 4-pole motor with a slot number $q=3$.

In the winding diagram shown in FIG. 1, the coils 1 and 2 which are associated with one pole pair and the coils 4 and 5 which are associated with the other pole pair are each connected in series. Both groups of coils are connected in parellel with each other and constitute the winding section which is to be switched on first. This winding section has one connecting lead connected to network phase R via first switch 7. The other lead of the winding section is tied to the corresponding leads of the winding sections of the other phases to form a Y-junction (here shown connected to ground).

The two other coils 3 and 6 are likewise connected in series. This series circuit is connected to phase R via second switch 8 which is closed some time after first switch 7 when the motor is started and is thus connected in parallel with the parallel branch circuits formed by coils 1 and 2 and coils 4 and 5.

Figure 2:
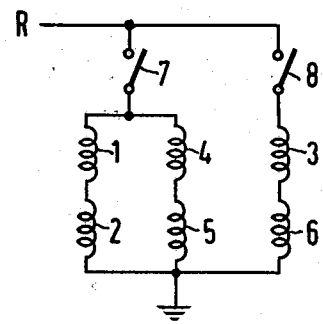
FIG. 2 is a schematic circuit diagram of the sectional winding shown in FIG. 1.

As can be seen from FIG. 2, there are, in the operating circuit, three parallel branches, each of which contains two series-connected coils. The parallel branches are therefore identical.

To start the motor, switch 7 is closed. Voltage is thereby applied to coils 1 and 2 and to coils 4 and 5 and the motor can start. Since coils 1 and 2 are spatially shifted 360°/p relative to coils 4 and 5, i.e., 180° in the case of a 4-pole motor, the magnetic forces acting on the rotor cancel each other. While the motor is starting up, two-thirds of the coils are connected and the motor can develop a correspondingly large torque to insure reliable starting. Switch 8 is closed later and the motor therefore makes a transition from the starting phase to the operating phase without need to interrupt the flow of current.

Figure 3:
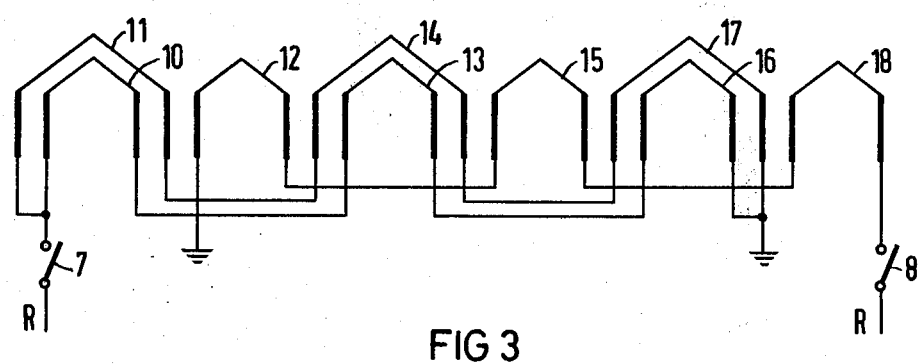
FIG. 3 is a winding diagram of a sectional winding for a 6-pole motor having a slot number $q=3$.

In the winding diagram for a six-pole motor shown in FIG. 3, the groups of coils 10, 13, 16 and 11, 14, 17, which are respectively associated with different pole pairs, are connected in series. Together, these groups form the winding section which is to be switched on first for starting the motor. These two groups of coils are connected in parallel to the network voltage.

The remaining coils 12, 15, 18 are also connected in series and form the winding section which is to be added later by means of switch 8. Switch 8, as before, connects this latter group of coils in parallel with the two parallel branches consisting of coil groups 10, 13, 16 and 11, 14, 17.

In FIG. 4, series-connected coils 20 to 22, 25 to 27, and 30 to 32, each form a group which is associated with one pole pair. These three groups of coils are connected parallel to the network phase R by switch 7. In this case, the winding section which is to be switchd on first consists of three parallel branches in which three coils each are connected in series. The three groups of coils are again placed so that they are shifted spatially 360°/p relative to each other, i.e., 120° in the case of the six-pole machine. Again the magnetic pulling forces acting on the rotor cancel each other.

The connection of the remaining coils is such that coils 23, 28, 33 and 24, 29, 34, respectively, associated with different pole pairs, are connected in series. Both of these series circuits are connected in parallel and can be connected to the network phase R by means of switch 8.

The sectional winding circuits of the invention have the advantage that the magnetic forces acting on the rotor during the starting phase cancel themselves. In addition, all coils can be made equal in these circuits, i.e., with the same number of turns and the same wire cross section.

What is claimed is:

1. In a sectional winding for a three phase motor, the motor having a number of pole pairs p which is equal to or greater than two and an uneven number of slots q, per pole and phase, which is greater than one and the motor having a single-layer winding which is divided into two winding sections for each phase, the winding sections of each phase adapted to be connected one after the other to the same phase of a supply network during start up of the motor, the improvement in which:

each section of the winding for a given phase comprises a plurality of coils, the section to be connected first comprising more than one-half of the coils for the given phase and comprising at least two branches each comprising a like plurality of coils connected in series, the branches connected together in parallel and the coils in each branch spaced apart 360° per pole pair;

the section which is to be connected later comprises at least one additional branch of a like plurality of coils connected in series, the additional branch is adapted to be connected in parallel to the first section; and each branch in the winding has the same number of turns.

2. A sectional winding for a three phase motor in accordance with claim 1 in which:

p=2 and q=3;

the winding section to be switched on first comprises two parallel branches of two series-connected coils each;

and the winding section to be switched on later comprises two series-connected coils.

* * * * *